Feb. 18, 1930.                K. J. HOWELL                 1,747,170
                        SPRING SEAT AND JACK PAD
                          Filed July 28, 1927

INVENTOR.
Kimbark J. Howell
BY
ATTORNEYS.

Patented Feb. 18, 1930

1,747,170

UNITED STATES PATENT OFFICE

KIMBARK J. HOWELL, OF MISHAWAKA, INDIANA, ASSIGNOR TO THE STUDEBAKER CORPORATION, OF SOUTH BEND, INDIANA, A CORPORATION OF NEW JERSEY

SPRING SEAT AND JACK PAD

Application filed July 28, 1927. Serial No. 209,069.

This invention relates to vehicle chassis and particularly to the spring seats therefor, the principal object being to provide a spring seat having an integral jack engaging portion to facilitate the placing of a lifting jack under the vehicle axle to raise the same.

Another object is to provide a vehicle chassis with a spring seat positioned between the spring and the axle thereof, the spring seat being provided with a spherical shaped portion adapted to engage a lifting jack.

A further object is to provide a vehicle chassis with a spring seat positioned between the spring and axle thereof, the spring seat having an integral outwardly extending portion provided with a spherical shaped end to form a pad for the head of a lifting jack.

These being among the objects of the present invention, the same consists of certain features of construction and combinations of parts to be hereinafter described with reference to the accompanying drawing and then claimed having the above and other objects in view.

Figure 1:
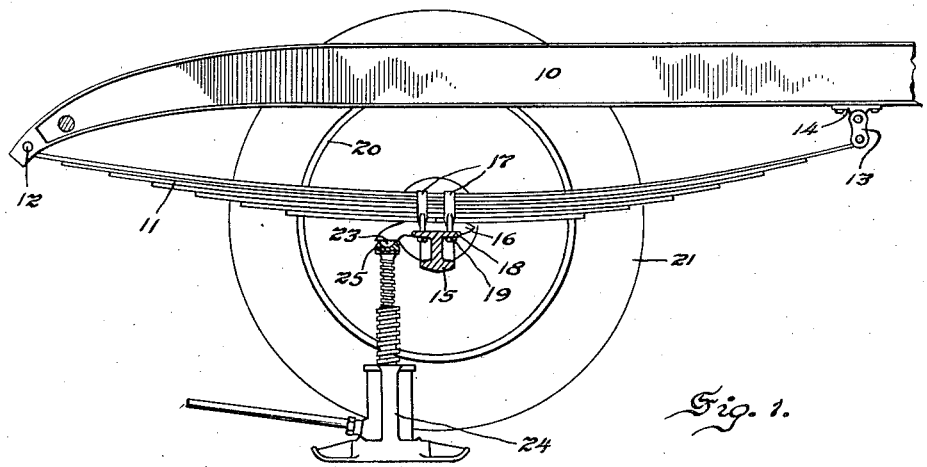

In the accompanying drawing which illustrates a suitable embodiment of the present invention, Figure 1 is a fragmentary side view of a vehicle chassis looking toward one of the front wheels showing the axle supported in raised position on a lifting jack.

Figure 2:
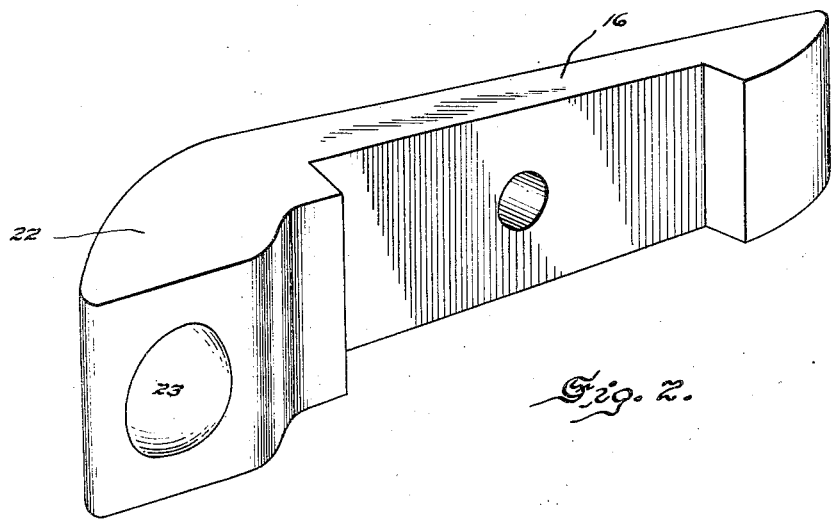

Figure 2 is an enlarged perspective view of the spring seat and jack pad.

Referring to the accompanying drawing, in which like numerals refer to like parts throughout the several views, each frame side rail 10 is provided with a leaf spring 11, pivoted at the front on a pin 12 extending through the frame spring horn and pivoted at the rear to a conventional shackle 13 carried by a bracket 14 secured to the frame side rail 10. The spring 11 is centrally supported by the front axle 15 and rests upon a spring seat member 16 mounted on the axle 15. U-bolts 17, extending downwardly at each side of the spring 11 and spring seat 16 and projecting through the upper axle flanges 18, are provided with nuts 19 threaded thereon to hold the spring 11, axle 15 and spring seat 16 in assembled position. A conventional vehicle wheel 20, provided with a tire 21, is rotatably secured to each end of the axle 15.

As shown in the drawing, the spring seat 16 is formed with an integral forwardly extending portion 22 provided with an integral spherical shaped pad 23 on its lower face and near the end thereof. The pad 23 is positioned in a plane somewhat above the lowest part of the axle 15 for a reason to be described later.

It has been extremely difficult since the advent of balloon tires, to obtain a lifting jack which could be slipped under the axle of a motor vehicle when one of the tires was deflated. If the minimum height of the jack was made sufficient to allow it to be positioned underneath the axle, the maximum raised height was not sufficient to allow the tire to be removed from the wheel. Other jacks having maximum raised heights sufficient to allow the tires to be removed from the wheels, have been used heretofore but they have not proved satisfactory because they could not be positioned underneath the most convenient part of the axle which is usually the lowest horizontal portion thereof. They are usually positioned underneath a spring leaf or under a non-horizontal portion of the axle, where they are unstable and liable to slip out of place and cause serious damage to the vehicle if the wheel or tire is removed.

The present invention eliminates these disadvantages as seen in Figure 1, which shows a screw type lifting jack 24 positioned underneath the vehicle to raise the wheel 20 above the ground level. The jack 24 is of the necessary maximum height to allow the tire to be removed and is provided with a spherical depression 25 formed in its head, which receives the spherical-shaped pad 23 of the spring seat 16 when the jack 24 is in raised position. The pad 23 is somewhat above the lowest part of the axle 15, and is forwardly thereof, so that the jack 24 can be conveniently positioned to raise the vehicle for removing the tires or wheels.

While I have shown my improved spring seat as being applied only at the front axle, it will be understood that it can be used with equal advantage at the rear axle, and its use is not limited to the exact location shown.

It can be seen that the jack pad 23 is located in the most accessible position and that a contact portion for the lifting jack is provided which eliminates the possibility of the jack disengaging and thereby allowing the end of the axle to drop down to damage the vehicle. It is to be understood that the present invention is not limited to the exact construction shown and that formal changes may be made in the specific embodiment of the invention described, without departing from spirit and substance of the broad invention, the scope of which is commensurate of the appended claims.

What I claim is:

1. In a device of the character described, the combination with a spring and axle of a vehicle chassis, of a member secured to said spring and axle and having a portion extending outwardly from the latter, the lower surface of said portion being characterized by a substantially semi-spherical projection surrounded by a plane surface and being adapted for engagement with a jack head having a substantially semi-spherical socket surrounded by a plane surface.

2. In a device of the character described, the combination with a spring and axle of a vehicle chassis, of a member interposed between said spring and axle and constituting a seat for said spring, said member having a portion extending outwardly and downwardly from said axle and arranged with its lower surface intermediate the top and bottom surfaces of said axle, and the lower surface of said member being characterized by a substantially semi-spherical projection surrounded by a plane surface and being adapted for engagement with a jack head having a substantially semi-spherical socket surrounded by a plane surface.

Signed by me at South Bend, Indiana, this 23rd day of July, 1927.

KIMBARK J. HOWELL.